United States Patent
Park et al.

(10) Patent No.: US 12,316,983 B2
(45) Date of Patent: May 27, 2025

(54) REFRIGERATOR

(71) Applicant: LG ELECTRONICS INC., Seoul (KR)

(72) Inventors: Hyunsung Park, Seoul (KR); Joongkeun Lee, Seoul (KR); Jeongyo Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/023,077

(22) PCT Filed: Sep. 2, 2021

(86) PCT No.: PCT/KR2021/011818
§ 371 (c)(1),
(2) Date: Feb. 24, 2023

(87) PCT Pub. No.: WO2022/050705
PCT Pub. Date: Mar. 10, 2022

(65) Prior Publication Data
US 2023/0224595 A1     Jul. 13, 2023

(30) Foreign Application Priority Data

Sep. 2, 2020   (KR) .................. 10-2020-0111748

(51) Int. Cl.
*H04N 23/90*  (2023.01)
*F25D 23/02*  (2006.01)
(Continued)

(52) U.S. Cl.
CPC ........... *H04N 23/90* (2023.01); *F25D 23/025* (2013.01); *G06V 10/25* (2022.01); *G06V 10/761* (2022.01);
(Continued)

(58) Field of Classification Search
CPC .... F25D 29/00; F25D 2500/06; F25D 23/028; F25D 29/003; F25D 29/005;
(Continued)

(56) References Cited

U.S. PATENT DOCUMENTS 11,112,170 B2   9/2021   Murata et al.
2006/0096303 A1   5/2006   Kavounas
(Continued)

FOREIGN PATENT DOCUMENTS

EP   2784419   10/2014
JP   2002-267337   9/2002
(Continued)

OTHER PUBLICATIONS

International Search Report (with English Translation) and Written Opinion dated Dec. 2, 2021 issued in Application No. PCT/KR2021/011818.
(Continued)

*Primary Examiner* — Masum Billah
(74) *Attorney, Agent, or Firm* — KED & ASSOCIATES

(57) ABSTRACT

A refrigerator according to the present embodiment comprises: a cabinet comprising a storage chamber; and a door for opening and closing the storage chamber. The door comprises: a main door comprising an opening and a door storage unit; a sub-door that opens and closes the opening and can rotate about a hinge with respect to the main door; a first camera and a second camera that are provided spaced apart from each other in the sub-door, and capture images of the door storage unit in a state where the sub-door is open; a marker provided on the main door and image-captured by the first camera; and a display unit for displaying result images including at least a portion of images captured by the first and second cameras.

20 Claims, 12 Drawing Sheets

(51) Int. Cl.
   *G06V 10/25* (2022.01)
   *G06V 10/74* (2022.01)
   *H04N 7/18* (2006.01)

(52) U.S. Cl.
   CPC ......... *H04N 7/181* (2013.01); *F25D 2400/36* (2013.01); *F25D 2500/06* (2013.01)

(58) Field of Classification Search
   CPC ........... F25D 2400/361; F25D 2700/06; F25D 2400/36; F25D 2700/02; F25D 2700/04; F25D 11/00; F25D 23/02; F25D 23/062; F25D 19/00; F25D 21/04; F25D 21/14
   USPC ....................................................... 348/159
   See application file for complete search history.

(56) References Cited

U.S. PATENT DOCUMENTS

| | | | | |
|---|---|---|---|---|
| 2014/0320647 | A1* | 10/2014 | Seo | F25D 29/00 |
| | | | | 348/143 |
| 2019/0072322 | A1* | 3/2019 | Murata | E05F 15/614 |

FOREIGN PATENT DOCUMENTS

| | | | |
|---|---|---|---|
| JP | 2014-070796 A | 4/2014 |
| KR | 10-2014-0127590 A | 11/2014 |
| KR | 10-2015-0127560 A | 11/2015 |
| KR | 10-2018-0114025 A | 10/2018 |

OTHER PUBLICATIONS

Extended European Search Report dated Sep. 26, 2024 issued in Application No. 21864664.4.

* cited by examiner

REFRIGERATOR

CROSS-REFERENCE TO RELATED PATENT APPLICATIONS

This application is a U.S. National Stage Application under 35 U.S.C. § 371 of PCT Application No. PCT/KR2021/011818, filed Sep. 2, 2021, which claims priority to Korean Patent Application No. 10-2020-0111748, filed Sep. 2, 2020, whose entire disclosures are hereby incorporated by reference.

TECHNICAL FIELD

The present disclosure relates to a refrigerator.

BACKGROUND ART

In general, a refrigerator is a home appliance that allows food to be stored at a low temperature in an internal storage space shielded by a door. To this end, the refrigerator is configured to cool the inside of the storage space using cold air generated through heat exchange with a refrigerant circulating in a refrigerating cycle, thereby storing food in an optimal state.

Recently, refrigerators are gradually becoming larger and more multi-functional in accordance with the trend of changing dietary habits and upgrading products, and refrigerators equipped with various structures and convenience devices capable of improving user convenience and efficiently using an internal space are being released.

The storage space of the refrigerator may be opened and closed by a door. Depending on the arrangement of the storage space and the structure of the door that opens and closes the storage space, the refrigerators may be classified into various types of refrigerators.

A separate storage space accessible from the outside may be provided in the door of the refrigerator. Through such a storage space, it is possible to access the storage space by opening some auxiliary doors or home bar doors without opening the entire refrigerator door.

Accordingly, frequently used foods may be stored in the separate storage space provided in the refrigerator door. Since the entire refrigerator door is not opened to store food, there is an advantage in minimizing leakage of cool air inside the refrigerator to the outside.

However, even in this structure, there is fundamentally a problem in that the food inside cannot be checked unless the refrigerator door is opened. That is, the door shall be opened to check whether desired food is stored in the space inside the refrigerator or in the separate storage space provided in the door. If there is no desired food when opening the auxiliary door or the home bar door, there is an inconvenience such as having to open the main door again, and at this time, there is a problem in that unnecessary leakage of cold air may occur.

In order to solve this problem, a part of a front surface of the refrigerator door may be formed of a transparent material, but in this case, an insulation problem may occur in the refrigerator. In addition, when the inside of the refrigerator may be seen through even when the refrigerator is not in use, food is exposed to the outside as it is, resulting in a very poor appearance.

Meanwhile, Korean Laid-Open Patent Publication No. 10-2015-0127560 (publication date: Nov. 17, 2015), which is a prior document, provides a refrigerator capable of providing information about food stored in a refrigerator even if a user does not open a door.

The refrigerator may include a cabinet having an opening formed in a front surface to allow a user to take in and take out food; a door rotatably mounted on the cabinet to open and close the opening; a storage space accommodated in the cabinet, partitioned between the door and the cabinet, and forming an independent cold air holding space for storing food therein; and a camera installed inside the storage space to obtain an image by photographing the food stored in the storage space.

According to prior document, a technology of displaying an image photographed by the camera on the door after the door is opened is disclosed.

However, in the case of the prior document, since the camera photographs the inside of the storage space, there is still a disadvantage in that the user cannot check the food stored in the door.

Invention

Technical Problem

The present embodiment provides a refrigerator capable of checking food stored in a storage space and food stored in a refrigerator door in a state in the refrigerator door is closed.

Optionally or additionally, the present embodiment provides a refrigerator capable of checking an entire door storage using a plurality of door cameras.

Optionally or additionally, the present embodiment provides a refrigerator capable of showing an optimal image of a door storage to a user.

Technical Solution

A refrigerator according to an aspect comprises a cabinet including a storage space and a door configured to open and close the storage space. The door comprises a main door including an opening and a door storage, a sub door configured to open and close the opening and rotatable about a hinge with respect to the main door, a camera provided in the sub door and configured to photograph the door storage in a state in which the sub door is open, and a marker provided on the main door and photographed by the camera.

The door may include a display configured to display a resultant image including at least some of images photographed by the camera.

The display may be provided on the sub door, for example.

The marker may be located closer to the storage space than the front wall of the main door.

The camera may include a first camera and a second camera spaced apart from each other.

The marker may include a first marker provided on the main door and photographed by the first camera and a second marker spaced apart from the first marker on the main door and photographed by the second camera.

The first camera and the second camera may be spaced apart from each other in an upper-and-lower direction, and the first marker and the second marker may be spaced apart from each other in an upper-and-lower direction.

The first marker and the second marker may be located closer to the storage space than the front wall of the main door.

The main door may include an upper wall, side walls and a lower wall forming the opening. The upper wall may include an inclined wall inclined downward from the opening to the storage space. The first marker may be disposed on the inclined wall.

The first marker may be located close to one of the side walls.

The main door may further include an upper-and-lower extension wall located closer to the storage space than the opening. The second marker may be located on the upper-and-lower extension wall.

The first camera and the second camera may photograph the door storage at regular time intervals until the sub door is closed after being opened, and a plurality of first images photographed by the first camera and a plurality of second images photographed by the second camera may be stored in a memory.

A first template image of a first marker and a second template image of a second marker photographed when an angle between a window of the first camera and a front surface of the main door forms a reference angle may be prestored in the memory.

A first ROI image including a first marker may be extracted from the plurality of first images, the extracted first ROI image may be compared with the first template image, and a first ROI image most similar to the first template image may be selected.

A second ROI image including a second marker may be extracted from the plurality of second images, the extracted second ROI image may be compared with the second template image, and a second ROI image most similar to the second template image may be selected.

A first image corresponding to the selected first ROI image and a second image corresponding to the selected second ROI image may be extracted.

The display may display a resultant image including the extracted first image and the extracted second image.

A refrigerator according to another aspect comprise a cabinet including a storage space and a door configured to open and close the storage space. The door comprises a main door including an opening and a door storage, a sub door configured to open and close the opening and rotatable about a hinge with respect to the main door, first and second cameras provided in the sub door, configured to photograph the door storage in a state in which the sub door is open, and spaced apart from each other, a marker provided on the main door and photographed by the first camera, and a display configured to display a resultant image including at least some of images photographed by the first and second cameras.

The marker may be located higher than the first camera and the first camera may be located higher than the second camera.

The first camera and the second camera may photograph the door storage at regular time intervals until the sub door is closed after being opened, and a plurality of first images photographed by the first camera and a plurality of second images photographed by the second camera may be stored in a memory.

A first template image of a marker photographed when an angle between a window of the first camera and a front surface of the main door forms a reference angle is prestored in the memory.

A first ROI image including a marker may be extracted from the plurality of first images, the extracted first ROI image may be compared with the first template image, a first ROI image most similar to the first template image may be selected, and a first image corresponding to the selected first ROI image is extracted.

A second image having the same photographing order as the extracted first image may be extracted from a plurality of second images. A resultant image including the extracted first image and the extracted second image may be displayed on the display.

Effect of the Invention

According to the present embodiment, it is possible to check food stored in a storage space and food stored in a refrigerator door in a state in the refrigerator door is closed.

In addition, as a plurality of door cameras is used, it is possible to check the entire door storage.

In addition, since an image photographed by a camera is used for a resultant image when the camera is positioned in front of the door storage, it is possible to show an optimal image of the door storage to a user.

In addition, since the image photographed by the camera may be determined at a point in time when the camera is located in front of the door storage based on the position of the marker in an image of a marker provided on a main door, a sensor for detecting the position of the door is unnecessary.

BEST MODE

Figure 1:
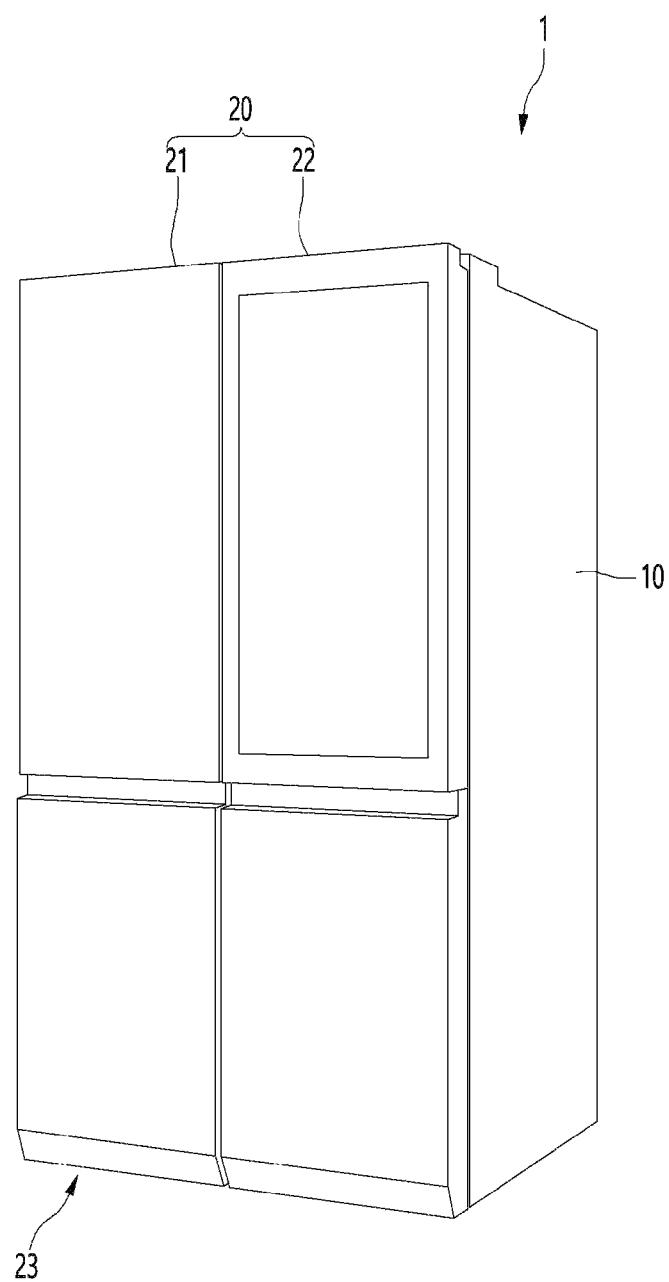
FIG. 1 is a perspective view of a refrigerator according to the present embodiment.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
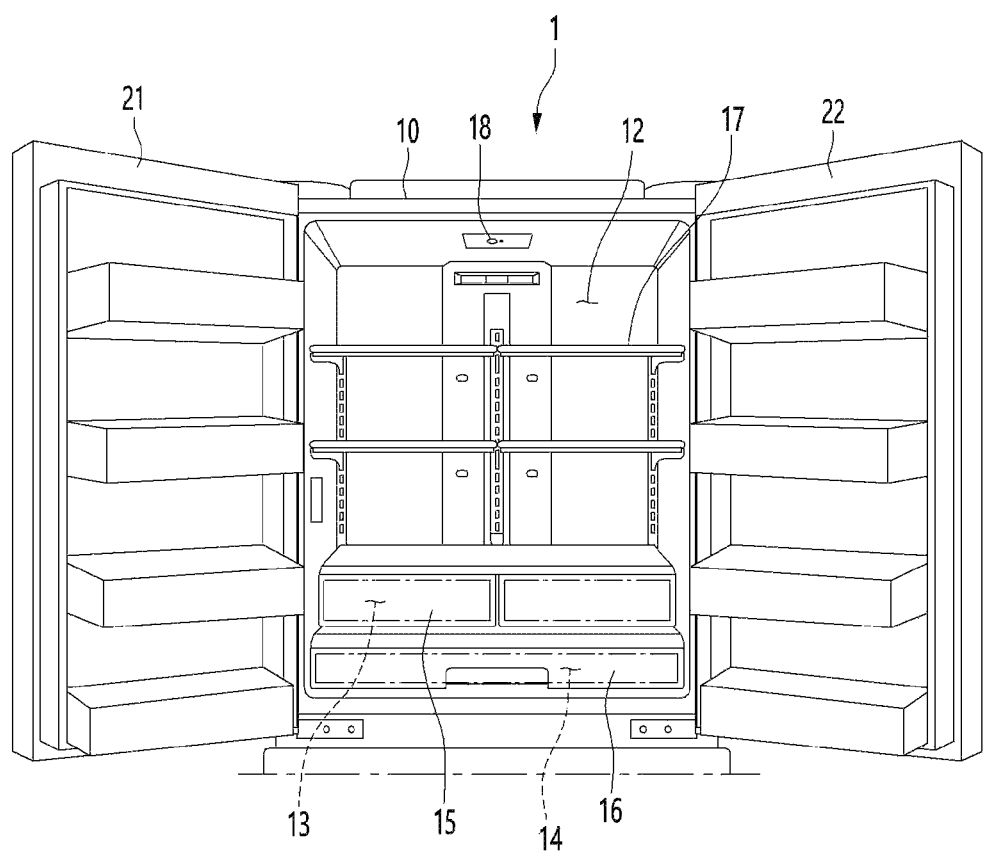
FIG. 2 is a view showing a state in which a refrigerating space door of the present embodiment is opened.
Figure 3:
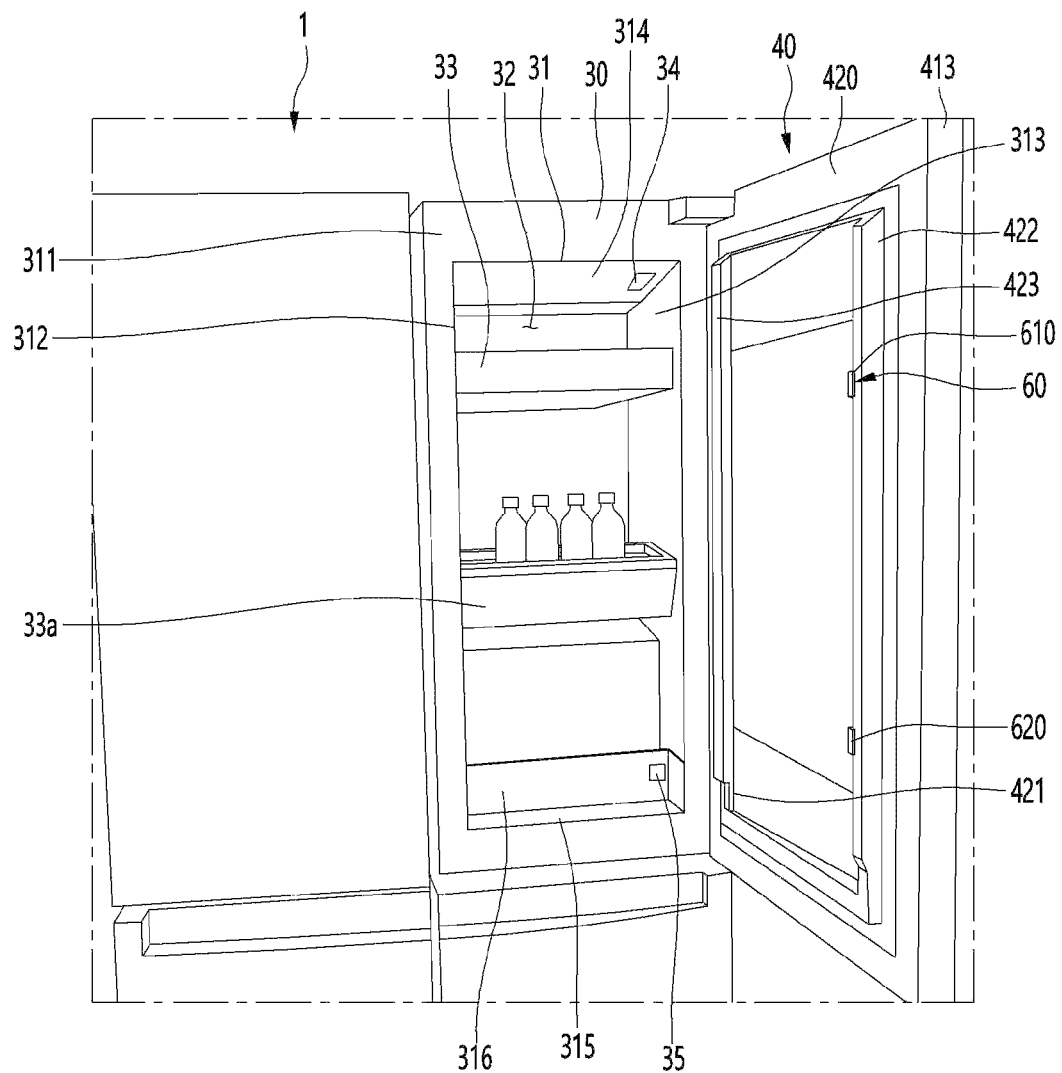
FIG. 3 is a view showing a state in which a sub door of the present embodiment is opened.
Figure 4:
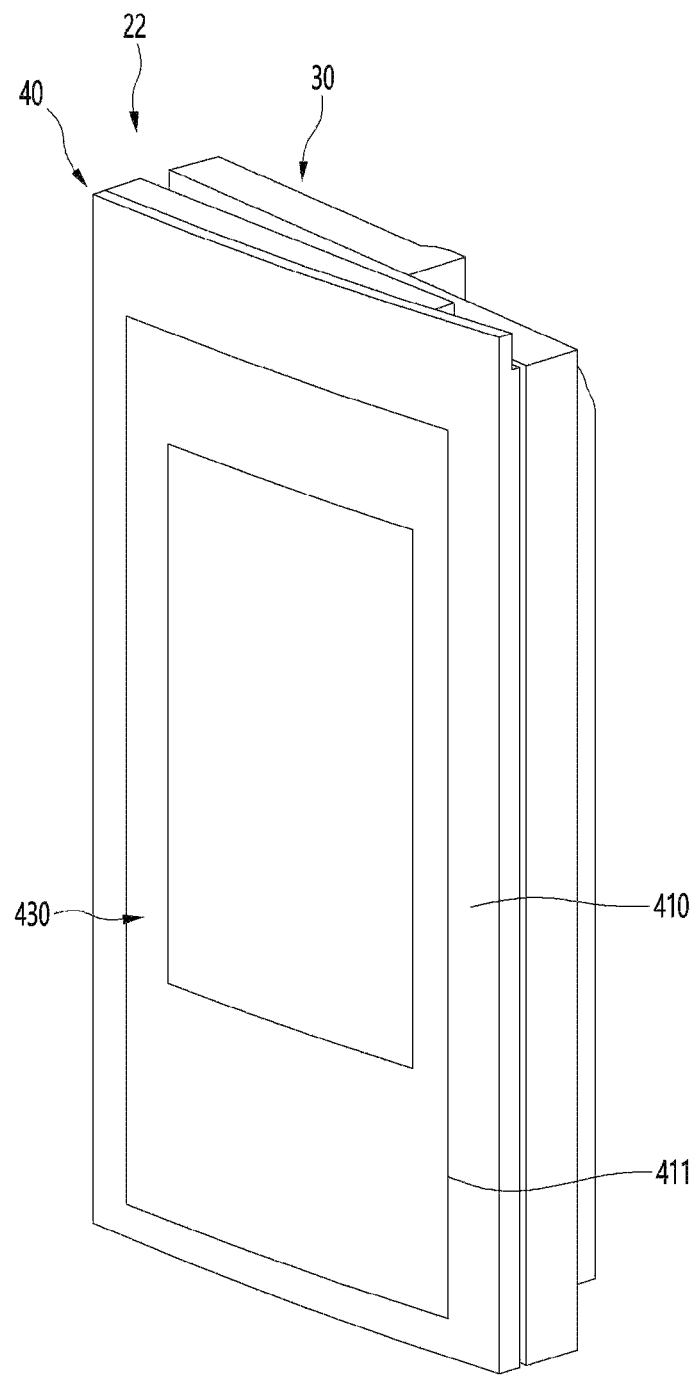
FIG. 4 is a perspective view of a refrigerating space door of the present embodiment.

FIG. 1 is a perspective view of a refrigerator according to the present embodiment, and FIG. 2 is a view showing a state in which a refrigerating space door of the present embodiment is opened. FIG. 3 is a view showing a state in which a sub door of the present embodiment is opened, and FIG. 4 is a perspective view of the refrigerating space door of the present embodiment.

Referring to FIGS. 1 to 4, the refrigerator 1 of the present embodiment may include a cabinet 10 having a storage space and refrigerator doors 20 and 23 opening and closing the storage space.

The storage space may include, for example, a refrigerating space 12. The refrigerating space 12 may be opened and closed by the refrigerating space door 20.

When the storage space additionally includes a freezer space, the freezer space may be opened and closed by the freezer space door 23. FIG. 1 shows the refrigerator 1 including the refrigerating space 12 and a freezer space as an example.

The refrigerating space 12 may be located above or below the freezer space, or may be located on the left or right side of the freezer space.

The refrigerating space door 20 may include a first refrigerating space door 21 and a second refrigerating space door 22 disposed from side to side. Each of the first and second refrigerating space doors 21 and 22 may be rotatably connected to the cabinet 10 by a hinge.

The freezer space door 23 may include a single door or a plurality of independently operated doors. When the freezer space door 23 includes a plurality of doors, at least one of the plurality of doors may be slidably connected to the cabinet 10 or rotatably connected to the cabinet 10 by a hinge.

At least one of the first or second refrigerating space doors 21 or 22 may include a main door 30 and a sub door 40. FIG. 3 shows the second refrigerating space door 22 including a main door 30 and a sub door 40 as an example.

The main door 30 may open and close the refrigerating space 12, and the sub door 40 may rotate with respect to the main door 30. The sub door 40 may be rotatably connected to the main door 30 or the cabinet 10.

The size of a front surface of the sub door 40 may be the same as that of a front surface of the main door 30. In this case, the sub door 40 may be disposed in a form overlapping the main door 30 in a state of being located in front of the main door 30.

Alternatively, the size of the front surface of the sub door 40 may be smaller than that of the front surface of the main door 30. In this case, a space where the sub door 40 is positioned is provided in the front surface of the main door 30, and the sub door 40 may be accommodated in the space. Then, the front surface of the sub door 40 may form a continuous surface with the front surface of the main door 30.

The inside of the refrigerating space 12 may be divided into a plurality of spaces by one or more shelves 17. The refrigerating space 12 may include one or more divided separate storages 13 and 14.

The storages 13 and 14 may include, for example, a vegetable compartment for storing vegetables. The vegetable compartment may be an internal space of a substantially slidable drawer 15. For example, two drawers 15 may be independently slidably arranged from side to side.

The storages 13 and 14 may include a multi-accommodation compartment. The multi-accommodation compartment is a space inside a separate basket 16 and may be opened and closed by a separate slidable storage space cover.

In order to check the inside of the storages 13 and 14, a user shall open the refrigerating space door 20 and then open the drawer 15 or open the cover again, which may cause cumbersomeness to users.

Accordingly, the refrigerator 1 may further include a storage space camera 18 for photographing the refrigerating space 12. The storage space camera 18 may photograph at least the storages 13 and 14. A resultant image obtained from an image photographed by the storage space camera 18 may be displayed through a display 440 provided in the refrigerating space door 20 in a state in which the refrigerating space door 20 is closed.

The storages 13 and 14 may be located at a lower side within the refrigerating space 12. In this case, the storage space camera 18 may be located close to a front end of an upper wall of the refrigerating space 12.

In a state in which the drawer 15 is open, the storage space camera 18 may look at the storages 13 and 14, so that the storages 13 and 14 may be photographed by the storage space camera 18.

For example, a discharge unit for discharging cold air toward the refrigerating space door 20 may be provided in an upper wall of the refrigerating space 12, and the storage space camera 18 may be located behind the discharge unit. The refrigerator 1 may further include a storage space lighting unit (see 72 in FIG. 6). The storage space lighting unit may be located behind the storage space camera 18. That is, the storage space camera 18 may be disposed between the discharge unit and the storage space lighting unit. The operation of the storage space camera 18 will be described later.

Meanwhile, referring to FIG. 3, the main door 30 may include an opening 31. In addition, the main door 30 may include a door storage 32. The door storage 32 may include door basket 33 and 33a fixed to or detachably connected to the main door 30. In addition, the door storage 32 may include a space between a plurality of door baskets 33. In addition, the door storage 32 may include a space between the plurality of door baskets 33 and 33a. Among the door baskets 33 and 33a, one basket 33a may be a moving basket 33a capable of moving up and down. The moving basket 33a may be located at a substantially central portion of the door storage 32.

The opening 31 may be covered by the sub door 40. The sub door 40 may open and close the opening 31. In a state in which the sub door 40 is open, the user may access the door storage 32 through the opening 31.

The sub door 40 may include an outer plate 410 and a door liner 420.

The outer plate 410 may form a front surface of the sub door 40. The outer plate 410 may be formed of, for example, a metal material. The outer plate 410 may include a first opening 411.

The door liner 420 may include a second opening 421. The second opening 421 may be disposed to face the first opening 412.

The sub door 40 may further include a panel assembly 430. The panel assembly 430 may be disposed to cover the first opening 411 and the second opening 421. Light may pass through the panel assembly 430. The door storage 32 is visible from the outside by the panel assembly 430.

The door liner 420 may include a pair of door dikes 422 and 423. The pair of door dikes 422 and 423 are parts of the door liner 420 protruding toward the cabinet 10, and may be located in the opening 31 of the main door 30 in a state in which the sub door 40 is closed. The door dikes 422 and 423 may serve to block leakage of cold air from the refrigerating space 12.

The pair of door dikes 422 and 423 may include a first dike 422 and a second dike 423 spaced apart from each other in a horizontal direction. Each of the dikes 422 and 423 may be formed long in an upper-and-lower direction.

During the rotation of the sub door 40, the radius of rotation of the first dike 422 around the hinge is greater than that of the second dike 423.

The first dike 422 may be positioned closer to a door adjacent in a horizontal direction than the second dike 423. In the present embodiment, the first dike 422 may be located closer to the first refrigerating space door 21 than the second dike 423.

A door camera 60 may be provided on at least one of the door liner 420 or the panel assembly 430. FIG. 3 shows the door camera 60 positioned on the door liner 420 as an example.

The door camera 60 may photograph the door storage 32. The upper-and-lower length of the door storage 32 may be longer than the left-and-right length thereof. Accordingly, the door camera 60 may include a first camera 610 and a second camera 620 so that the door camera 60 may photograph the entire area of the door storage 32. The first and second cameras 610 and 620 may be spaced apart from each other in an upper-and-lower direction and disposed on the door liner 420.

The second camera 620 may be located below the first camera 610.

The first and second cameras 610 and 620 may be provided in the first dike 422. Based on a bisector that bisects the height of the first dike 422, the first camera 610 may be positioned higher than the bisector, and the second camera 620 may be positioned lower than the bisector.

One or more markers 34 and 35 may be provided on the main door 30. For example, the main door 30 may include a first marker 34 and a second marker 35 positioned lower than the first marker 34.

The colors of the first marker 34 and the second marker 35 are darker than that of the surface of the main door 30 so that the first marker 34 and the second marker 35 may be easily distinguished from the main door 30. For example, the first marker 34 and the second marker 35 may include black or gray. If the main door 30 includes one marker, the second marker 35 may be omitted.

An optimal position where the first marker 34 may be attached will be described.

A wall forming the opening 31 of the main door 30 may include an upper wall, side walls 312 and 313 and a lower wall 315. In this case, the upper wall may include an inclined wall 314. For example, the inclined wall 314 may be disposed to be inclined downward from the side of the opening 31 toward the inside.

First, it may be considered to position the first marker 34 on the front wall 311 of the main door 30.

When the sub door 40 is opened, the storage space lighting unit, which will be described later, may be turned on. Since the storage space lighting unit irradiates light to the door storage 32, light from the storage space lighting unit does not substantially reach the front wall 311.

In this state, when the first camera 610 photographs the first marker 34, since the front wall 311 around the first marker 34 including the first marker 34 is photographed in a dark state, it is difficult to distinguish between the first marker 34 and other parts.

Next, it may be considered to position the first marker 34 on the upper side of the left wall 312.

When the first marker 34 is located on the upper side of the left wall 312, light from the storage space lighting unit may reach the first marker 34. However, even if the storage space lighting unit is turned on, when the opening angle of the sub door 40 is small, for example, when the opening angle is less than 50 degrees, the amount of light reaching the first marker 34 is small, so that the left wall 312 around the first marker 34 including the first marker 34 is photographed in a dark state. Therefore, it is difficult to distinguish between the first marker 34 and other parts.

Next, it may be considered to position the first marker 34 on the upper side of the right wall 313.

When the first marker 34 is located on the upper side of the right wall 313, light from the storage space lighting unit may reach the first marker 34. However, even if the storage space lighting unit is turned on, if the opening angle of the sub door 40 is large, for example, if the opening angle is greater than 70 degrees, due to the position of the first and second door cameras 610 and 620, it is likely that the first marker 34 is not photographed regardless of the amount of light reaching the first marker 34.

Next, it may be considered to position the first marker 34 on the moving basket 33a. However, since the position of the moving basket 33a may be changed as described above, the position of the first marker 34 is also changed, which is not preferable.

Next, it may be considered to position the first marker 34 on the inclined wall 314 of the upper wall.

When the first marker 34 is located on the inclined wall 314, the light from the storage space lighting unit reaches the first marker 34 so that the first marker 34 may be easily distinguished from the surroundings, and an image photographed by the first camera 610 may include the first marker 34 regardless of the opening angle of the sub door 40.

Therefore, the first marker 34 is preferably disposed on the inclined wall 314. That is, the first marker 34 may be disposed to be inclined with respect to the front wall 311. The first marker 34 may be located higher than the first camera 610.

In particular, when the sub door 40 is open, the first marker 34 may be located closer to one of the side walls so that the user does not easily recognize the first marker 34. For example, the first marker 34 may be located adjacent to the right wall 313 of the inclined wall 314.

Due to the structure of the main door 30, the main door 30 may include an upper-and-lower extension wall 316 disposed at positions spaced apart from the front wall 311 to the rear side.

For the same reason as described above, the second marker 35 may be disposed on the upper-and-lower extension wall 316.

Accordingly, the first marker 34 and the second marker 35 may be located closer to the refrigerating space 12 than to the front wall 311 of the main door 30.

The second marker 35 may be located higher than the lower wall 315. The first marker 34 may be located lower than the second camera 620.

In addition, the second marker 35 may be located closer to one of the side walls of the upper-and-lower extension wall 316. For example, the second marker 35 may be located adjacent to the right wall 313.

When the sub door 40 is closed due to the position of the markers 34 and 35, the markers 34 and 35 are covered by the sub door 40 and may be prevented from being exposed to the outside.

In a state in which the sub door 40 is open, an image photographed by the first camera 610 may include the first marker 34 and an image photographed by the second camera 620 may include the second marker 34.

Figure 5:
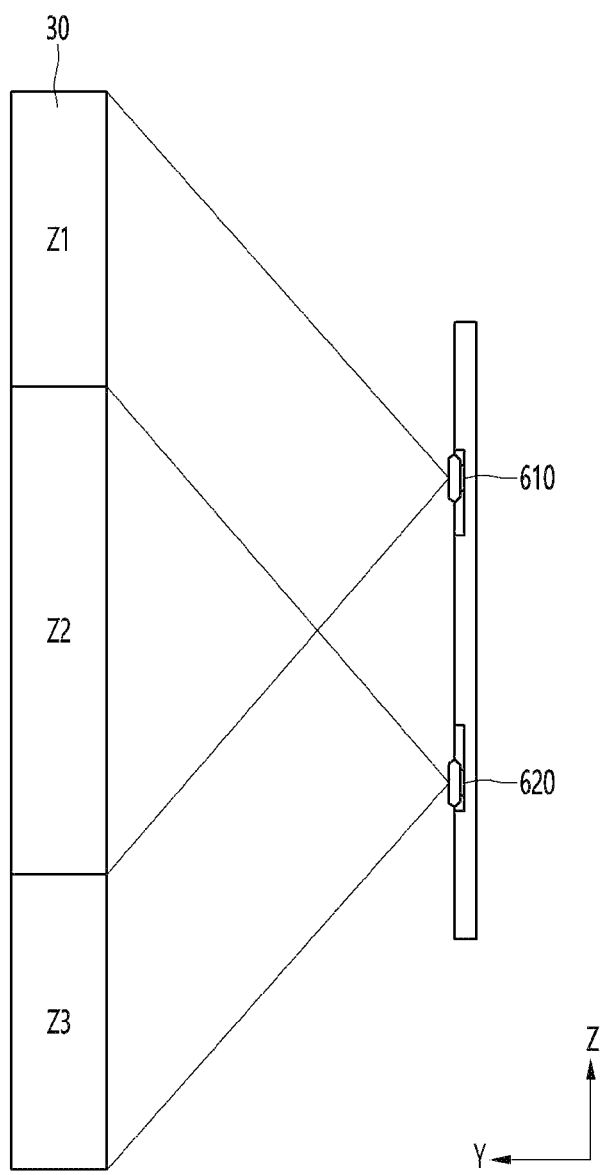
FIG. 5 is a diagram showing an area photographed by a first camera and a second camera according to the present embodiment.

FIG. 5 is a diagram showing an area photographed by a first camera and a second camera according to the present embodiment.

Referring to FIG. 5, in a state in which the sub door 40 is open, the first camera 610 photographs an upper portion and central portion of the main door 30, and the second camera 620 photographs the central portion and lower portion of the main door 30.

The main door 30 may be divided into first to third areas Z1, Z2, and Z3 in the upper-and-lower direction.

The first area Z1 is an area photographed only by the first camera 610. The first marker 34 may be located in the first area Z1.

The second area Z2 is an area located below the first area Z1, and is an area commonly photographed by the cameras 610 and 620.

The third area Z3 is an area located below the second area Z2 and is photographed only by the second camera 620. The second marker 35 may be located in the third area Z3. In this embodiment, the size of the area is illustrative and is not limited to the area shown in the drawings.

An image photographed by the first camera 610 includes the first area Z1 and the second area Z2, and an image photographed by the second camera 620 includes the second area Z2 and the third region Z3.

One image including the first to third areas Z1 to Z3 may be obtained by overlapping the second area Z2 in the two images acquired by the cameras 610 and 620.

As another example, a first image part may be generated by extracting at least a part of the first area Z1 and a part of the second area Z2 from the image acquired by the first camera 610, and a second image part may be generated by extracting another part of the second area Z2 and at least a part of the third area Z3 from the image acquired by the second camera 620. Then, it is also possible to obtain one resultant image by synthesizing the first image part and the second image part.

Figure 6:
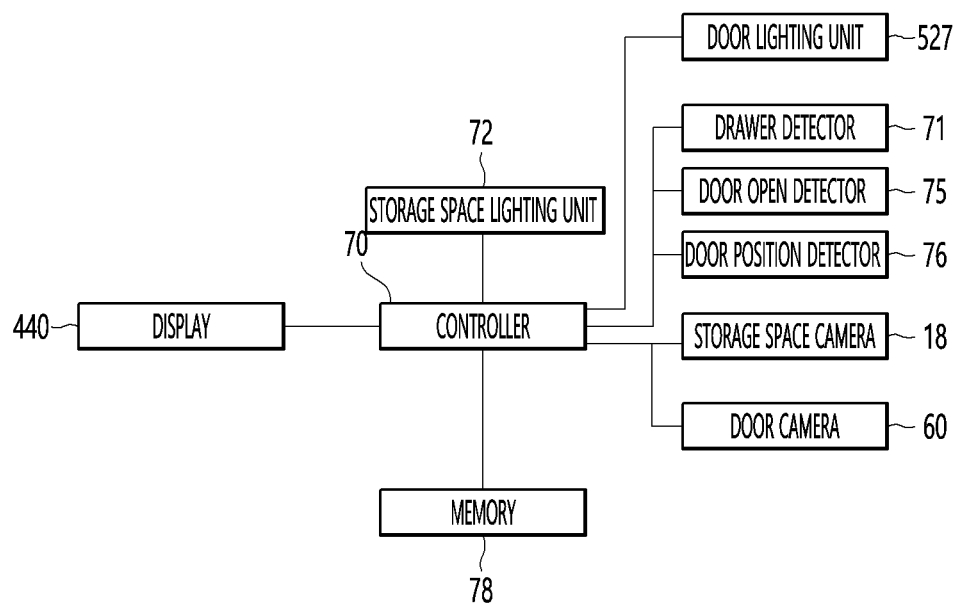
FIG. 6 is a block diagram of a refrigerator according to the present embodiment.
Figure 7:
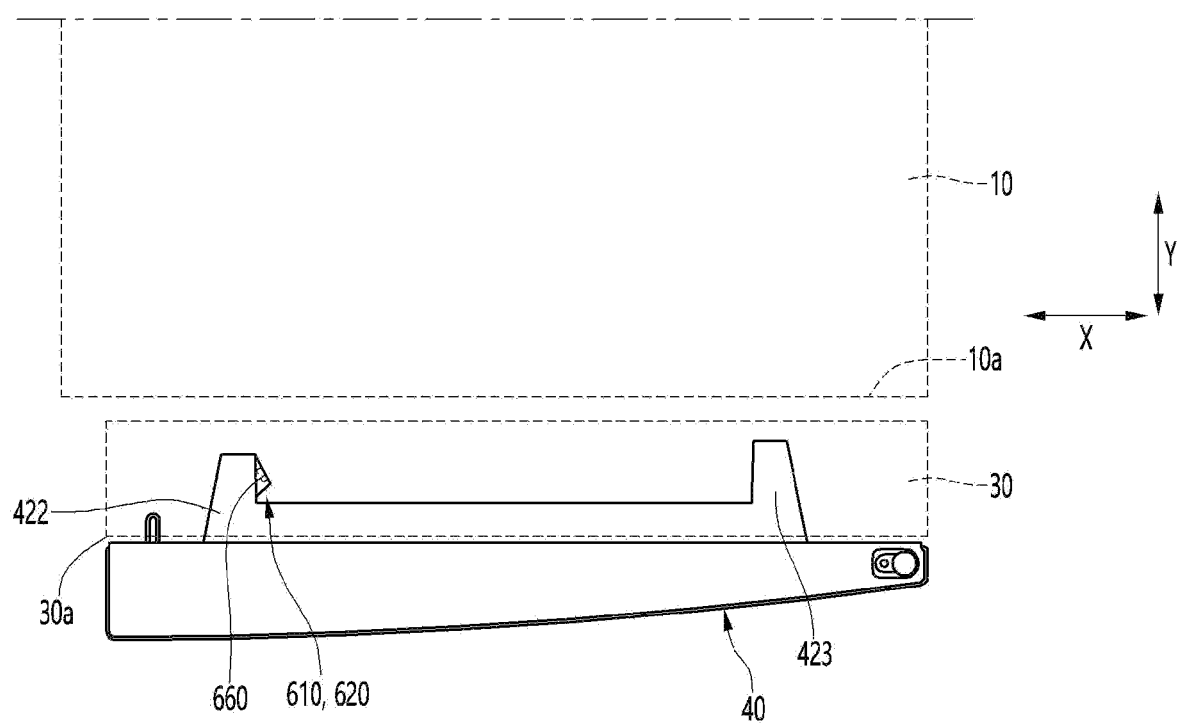
FIG. 7 is a view showing a state in which a main door and a sub door are closed.
Figure 8:
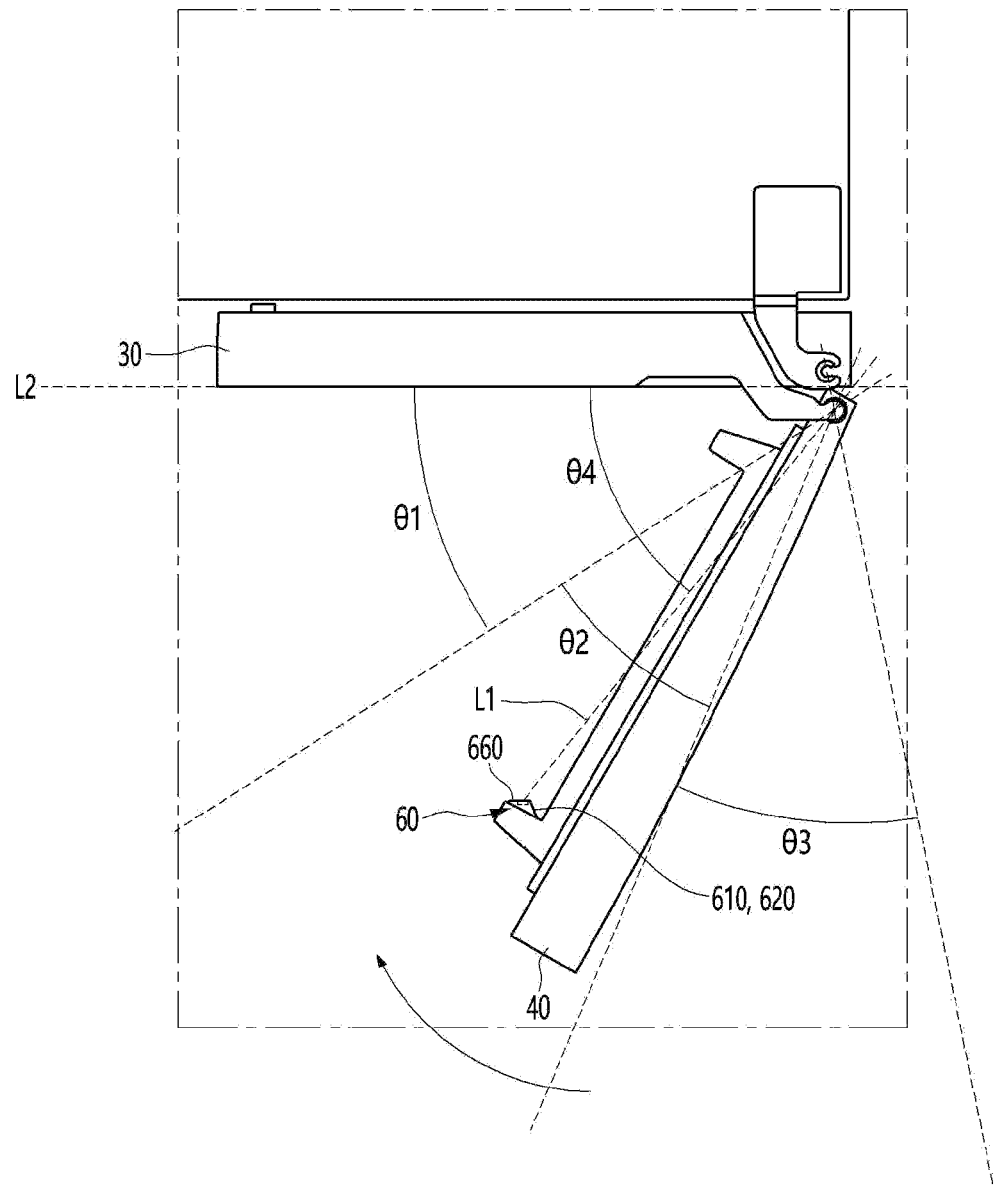
FIG. 8 is a view showing a state in which a sub door is closed after being opened at a maximum opening angle.

FIG. 6 is a block diagram of a refrigerator according to the present embodiment, FIG. 7 is a view showing a state in which a main door and a sub door are closed, and FIG. 8 is a view showing a state in which a sub door is closed after being opened at a maximum opening angle.

Referring to FIGS. 6 to 8, the refrigerator 1 according to the present embodiment may include a controller 70. The controller 70 may control the overall operation of the refrigerator 1, control the operation of some of the components constituting the refrigerator 1, or control some functions included in the refrigerator 1.

The refrigerator 1 may further include a memory 78. Images photographed by the storage space camera 18 and the door camera 60 may be stored in the memory 78. In addition, a past resultant image may be stored in the memory 78.

The refrigerator 1 may further include a display 440. The display 440 may be provided on the sub door 40. For example, the display 440 may be provided on the panel assembly 430 of the sub door 40.

For example, the display 440 may further include a touch panel for touch input and an LCD panel for outputting a screen. The display 440 may display a resultant image obtained from an image photographed by the storage space camera 18.

When receiving a first operation command, the controller 70 may operate the display 440. The display 440 may operate, for example, in a state where the main door 30 and the sub door 40 are closed.

The refrigerator 1 may further include a storage space lighting unit 72. The storage space lighting unit 72 may be turned on, when the refrigerator doors 20 and 23 are opened.

The refrigerator 1 may further include a door open detector 75 for detecting opening of the refrigerating space door 20.

The storage space camera 18 may operate when the refrigerating space door 20 is opened and the storage space lighting unit 72 is turned on.

The refrigerator 1 may further include a door position detector 76 for detecting an open position of the refrigerating space door 20.

The door position detector 76 may include an optical sensor. The optical sensor may be positioned around a hinge of the refrigerating space door 20, for example. The optical sensor may include a light emitting unit and a light receiving unit. Intensity of light received by the light receiving unit may vary during the process of opening the refrigerating space door. A signal output from the light receiving unit may vary according to the intensity of light received by the light receiving unit.

The controller 70 may check the rotation direction and rotation angle of the refrigerating space door 20 based on the variable pattern of the signal output from the light receiving unit.

The controller 70 may control the storage space camera 18 to photograph the refrigerating space 12 when the refrigerating space door 20 reaches a photographing reference angle in the case where the refrigerating space door 20 is closed after the refrigerating space door 20 is opened at an opening reference angle or more.

As described above, the image photographed by the storage space camera 18 may include at least a portion of the shelf 17 and at least a portion of the multi-accommodation compartment. A resultant image (current resultant image) obtained from the photographed image may be displayed on the display 440.

Although not limited, the opening reference angle may be greater than or equal to 90 degrees. Also, the photographing reference angle may be 45 degrees.

Accordingly, when the refrigerating space door 20 is closed after the refrigerating space door 20 is opened at less than the opening reference angle, the storage space camera 18 may not operate. In this case, since the storage space camera 18 did not photograph the storage space 12, a past resultant image may be displayed on the display 440 instead of a current resultant image.

The refrigerator 1 may further include a drawer detector 71 for detecting movement of the drawer 15.

When movement of the drawer 15 to a specific position is detected by the drawer detector 71, the storage space camera 18 may photograph the storages 13 and 14.

For example, when the drawer detector 71 detects a withdrawal completion position of the drawer 15, the storage space camera 18 may photograph the storage 13. A photographing surface or lens of the storage space camera 18 may be inclined to face the front side of the cabinet 10 so that the storage space camera 18 may photograph the inside of the drawer 15 at the withdrawal completion position of the drawer 15.

Due to the arrangement of the storage space camera 18, the image photographed by the storage space camera 18 may include at least a portion of the shelf 17 and at least a portion of the multi-accommodation compartment.

As another example, a marker may be present in the drawer 15. When the drawer detector 71 detects opening of the drawer 15, the storage space camera 18 photographs the storage 13. The storage space camera 18 takes pictures until the drawer 15 is closed. That is, the storage space camera 18 acquires a plurality of images by photographing the drawer 15 at regular time intervals from opening to closing of the drawer 15.

Photographed images include the marker. The position of the marker in the image may vary according to the position of the drawer 15.

A reference image of the drawer including the marker may be stored in the memory 78. The reference image may be, for example, an image photographed when the drawer 15 is maximally withdrawn.

Among a plurality of photographed images, an image in which the position of the marker is the same as the position of the marker on the reference image may be selected, and a resultant image acquired from the selected image may be displayed on the display 440.

The refrigerator 1 may further include a door lighting unit 527 provided in the refrigerating space door 20. The door lighting unit 527 may be provided in the main door 30 or in the sub door 40.

When receiving a knock-on command applied to the panel assembly 430, the controller 70 may turn on the door lighting unit 527 in a state in which the sub door 40 is closed. At this time, the storage space lighting unit 72 may also be turned on.

In this case, the user may check the inside of the door storage 32 with the sub door 40 closed. The controller 70 may turn off the door lighting unit 527 when opening of the sub door 40 is detected. At this time, the storage space lighting unit 72 may be turned on.

When opening of the sub door 40 is detected, the first camera 610 and the second camera 620 may operate.

As described above, the display 440 may display resultant images obtained from images photographed by the first and second cameras 610 and 620.

Meanwhile, referring to FIG. 7, the window 660 of the first and second cameras 610 and 620 is disposed to be inclined at a predetermined angle with the front surface 10a of the cabinet 10 or the front surface 30a of the main door 30 in a state in which the main door 30 and the sub door 40 are closed.

In FIG. 7, an axis parallel to the front surface 30a of the main door 30 and extending in a left-and-right horizontal direction may be referred to as an X axis, and an axis perpendicular to the X axis in a horizontal direction may be referred to as a Y axis. An axis perpendicular to the X and Y axes and extending in a upper-and-lower direction may be referred to as a Z axis (see FIG. 5).

In the present embodiment, the window 660 is disposed to be inclined with respect to the X axis and the Y axis in a state in which the main door 30 and the sub door 40 are closed. On the other hand, the window 660 may be parallel to the Z axis.

The controller 70 may operate the door camera 60 when the operating condition of the door camera 60 is satisfied. When the operating condition is satisfied, opening of the sub door 40 is detected.

When opening of the sub door 40 is detected, the first and second cameras 610 and 620 photograph the main door 30 including the door storage 32 at predetermined time intervals.

Images photographed at regular time intervals are stored in the memory 78. At this time, first images (first image group) photographed by the first camera 610 and second images (second image group) photographed by the second camera 610 are separately stored in the memory 78.

The first and second cameras 610 and 620 photograph the main door 30 at regular time intervals until opening and closing of the sub door 40 is detected.

When closing of the sub door 40 is detected, the controller 70 selects one first image from the first image group stored in the memory 78 and selects one second image from the second image group.

Referring to FIG. 8, the sub door 40 may be opened by a maximum opening angle θ1+θ2+θ3. During the opening process of the sub door 40, the opening angle of the sub door 40 may be divided into three angle sections θ1, θ2, and θ3. For example, θ1, θ2, and θ3 have the same size.

The selected first image and second image may be images photographed when the sub door 40 is located in the second angle section.

More specifically, when an angle formed by a virtual line L1 connecting the hinge of the sub door 40 and the window 660 and a virtual line L2 passing through the front surface 30a of the main door 30 is a reference angle θ4, the window 660 is substantially aligned with the front surface 30a of the main door 30.

In a state in which the main door 30 and the sub door 40 are closed, the front surface 30a of the main door 30 and the window 660 may be inclined by the reference angle θ4.

The reference angle θ4 may be, for example, greater than or equal to 50 degrees and less than 70 degrees.

Preferably, the reference angle θ4 may be 60 degrees. When the reference angle θ4 is 60 degrees, the window 660 may be located at or close to a bisecting point bisecting the main door 30 from side to side while securing a distance between the window 660 and the front surface 30a of the main door 30 and thus the main door 30 may be photographed to be seen best.

The selected first image and second image are images photographed when an angle between the window 660 and the front surface 30a of the main door 30 is the reference angle θ4 in a state in which the main door 30 and the sub door 40 are closed.

In addition, the selected first image and second image may be images photographed while the sub door 40 is opened and then closed.

Figure 9:
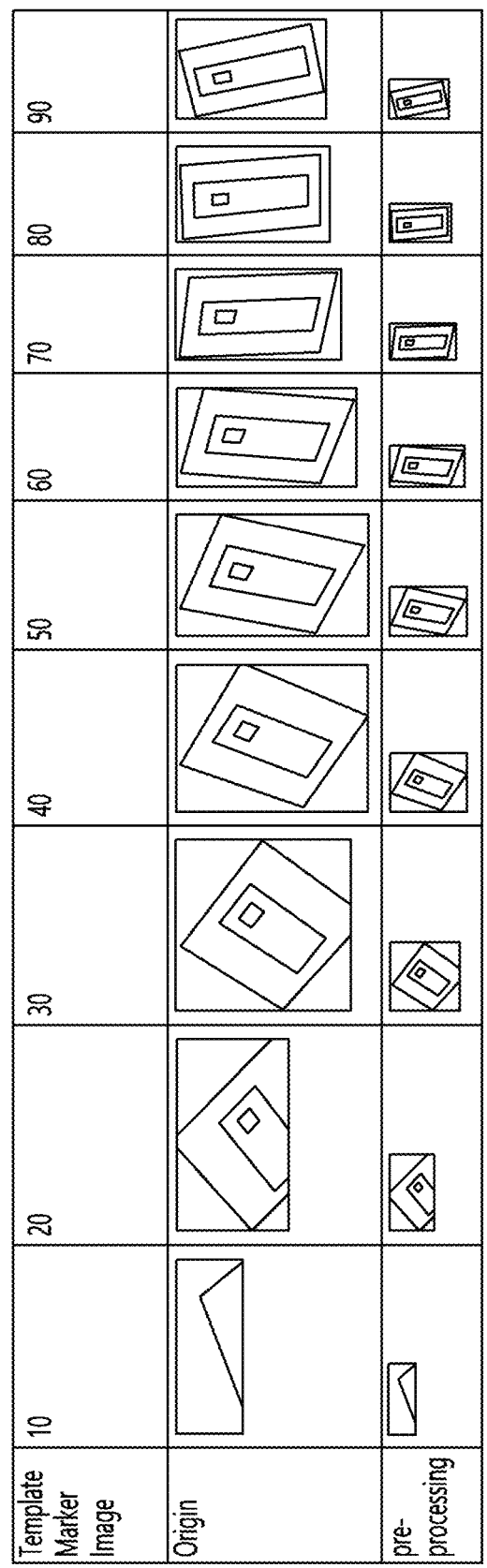
FIG. 9 is a view showing an ROI image of a first marker extracted from images photographed for each angle in a door opening process.
Figure 10:
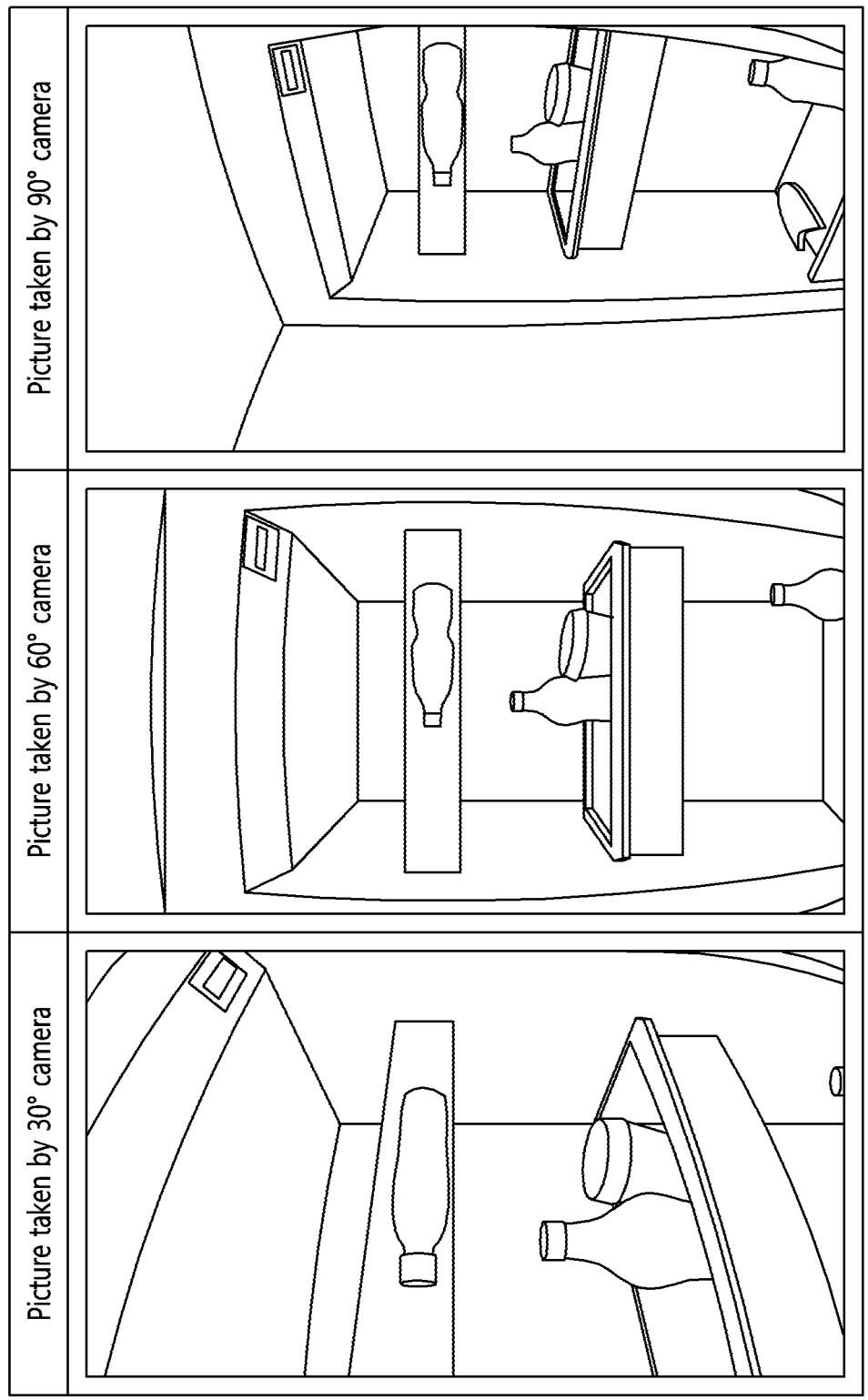
FIG. 10 is a view showing images photographed by a first camera for each angle in the door opening process.

FIG. 9 is a view showing an ROI image of a first marker extracted from images photographed for each angle in a door opening process, and FIG. 10 is a view showing images photographed by a first camera for each angle in the door opening process.

FIGS. 9 and 10, a first image photographed by the first camera 610 may include the first marker 34, and a second image photographed by the second camera 620 may include the second marker 35.

The position of the first marker 34 may be changed on a plurality of first images photographed according to the opening angle of the sub door 40. In addition, the shape, size and angle of the second marker 35 may be changed on a plurality of second images photographed according to the position of the sub door 40.

In the memory 78, a first template image of the first marker 34 and a second template image of the second marker 35 photographed when the angle between the window 660 and the front surface 30a of the main door 30 forms a reference angle θ4 may be stored.

The first template image may also include the first marker 34, and the second reference-template image may also include the second marker 35.

The controller 70 may extract first ROI images including the first marker 34 from the plurality of photographed first images, and extract second ROI images including the second marker 34 from the plurality of photographed second images.

Then, the controller 70 performs a pre-processing process on the extracted ROI images. For example, the controller 70 may optimize the size of the ROI images after applying a gray scale to the extracted ROI images. Next, noise may be removed from the ROI images with the optimized size, and a histogram smoothing process may be performed.

Then, finally, the controller 70 may compare the preprocessed ROI images with the first and second template images.

In the present embodiment, the first image stored last in a group of the plurality of first images stored in the memory 78 is an image photographed right before the sub door 40 is closed. Therefore, the controller 70 may sequentially perform comparison with the first template image starting from the first ROI image extracted from the image stored last in the group of first images and select a first ROI image most similar to the first template image, in order to select the first image photographed in the process of closing the sub door 40.

In addition, the second image stored last in a group of the plurality of second images stored in the memory 78 is an image photographed right before the sub door 40 is closed. Therefore, the controller 70 may sequentially perform comparison with the second template image starting from the second ROI image extracted from the image stored last in the group of second images, in order to select the second image photographed in the process of closing the sub door 40.

Then, a first image corresponding to the selected first ROI image and a second image corresponding to the selected second ROI image may be extracted.

Figure 11:
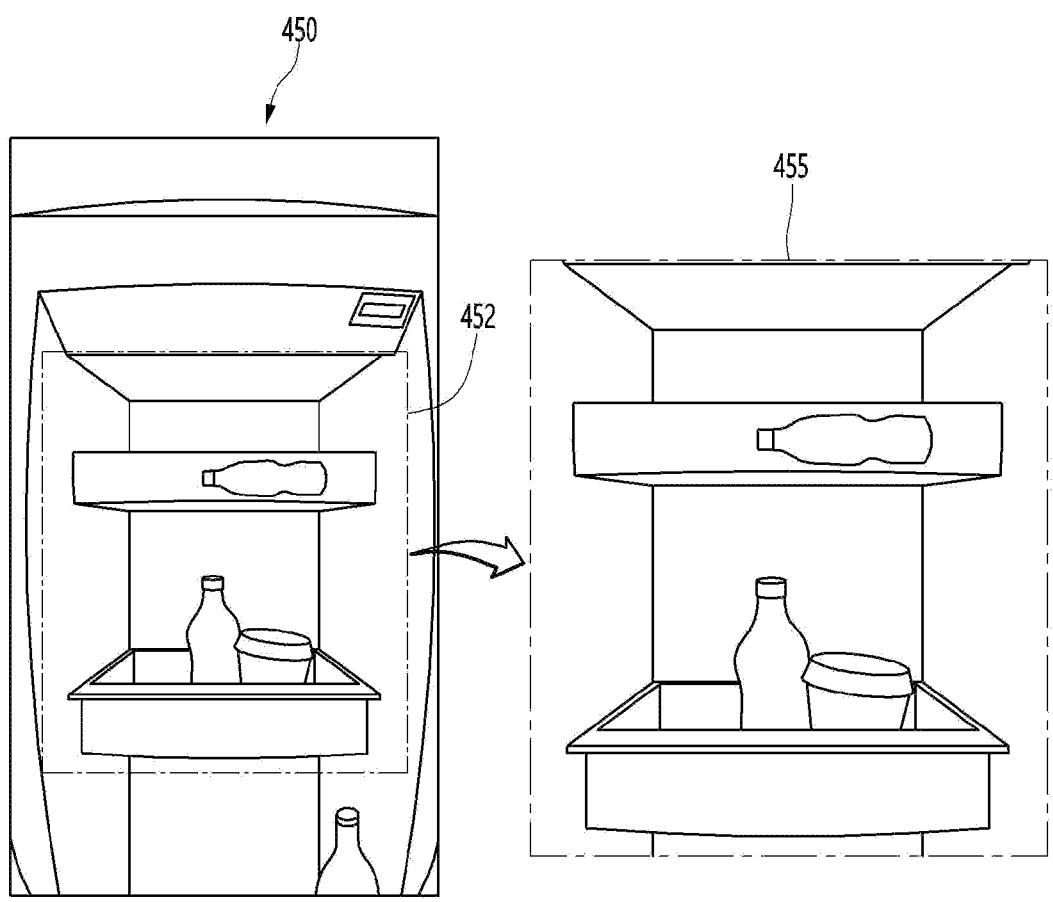
FIG. 11 is a diagram showing a state in which a first image part is extracted from a first image photographed by a first camera.
Figure 12:
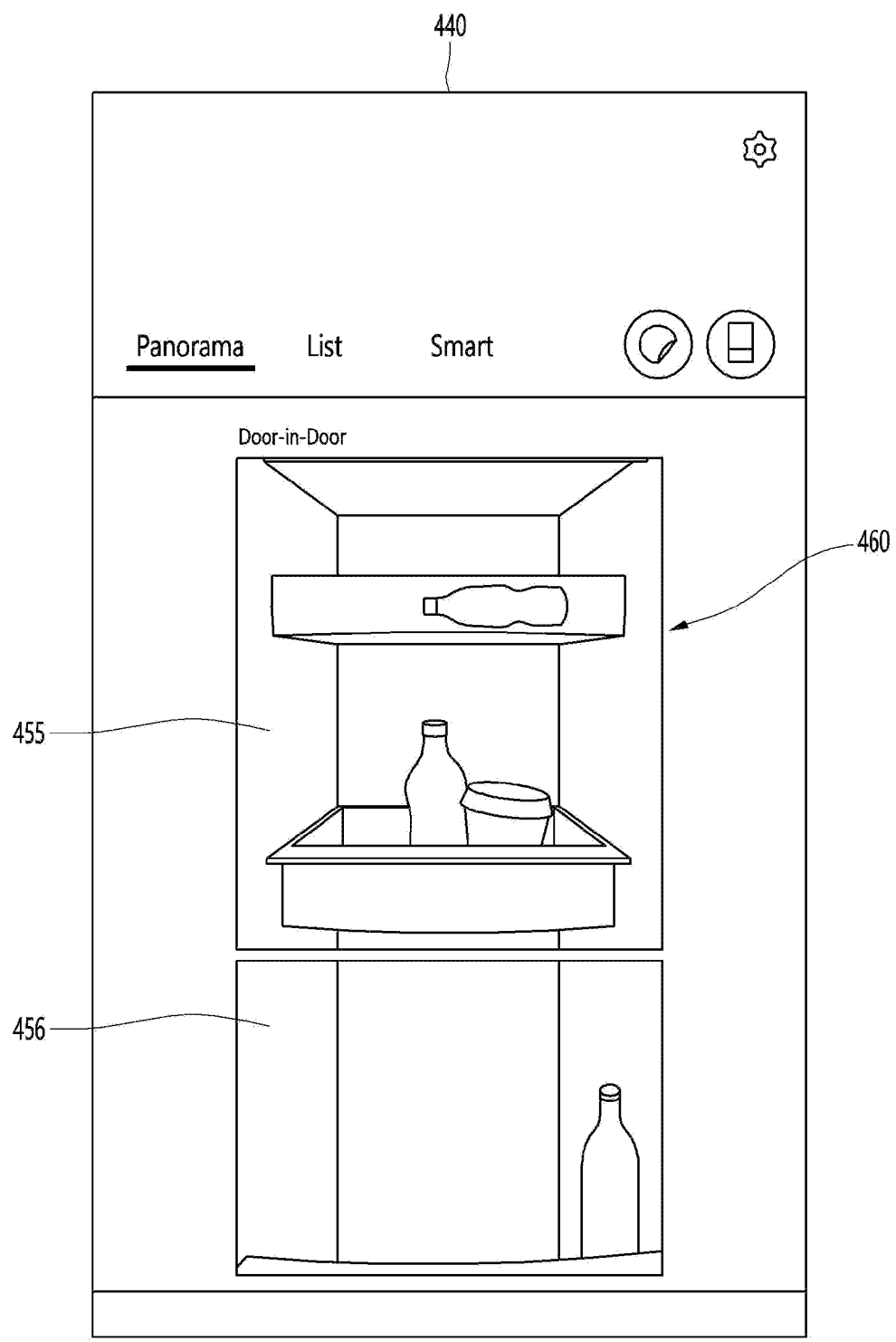
FIG. 12 is a diagram showing a screen displayed on a display.

FIG. 11 is a diagram showing a state in which a first image part is extracted from a first image photographed by a first camera, and FIG. 12 is a diagram showing a screen displayed on a display.

FIGS. 11 and 12, when the refrigerating space door 20 is opened and then closed, a screen including a resultant image obtained from an image photographed by the storage space camera 18 may be displayed on the display 440.

When the sub door 40 is opened and then closed in a state in which the refrigerating space door 20 is closed, a screen including the resultant image 460 obtained from the images photographed by the first and second cameras 610 and 620 may be displayed on the display 440.

The resultant image 460 may include a first image part 455 extracted from the first image 450 photographed by the first camera 610 and a second image part 456 extracted from the second image photographed by the second camera 620.

In the method described above, the controller 70 may select the first image 450 from the group of first images and extract the first image part 455 to be displayed on the display 440 from the selected first image 450.

Also, the controller 70 may select a second image from the group of second images and extract the second image part 456 to be displayed on the display 440 from the selected second image.

Finally, the controller 70 may display the resultant image 460 including the first image part 455 and the second image part 456 on the display 440.

The resultant image 460 may be stored in memory 78. As such, since the resultant image 460 is stored in the memory 78, the resultant image 460 may be displayed on the display 440 by input of a display command in a state in which the refrigerating space door 20 is closed and the sub door 40 is closed.

Accordingly, the user may easily check the food stored in the refrigerating space 12 or the door storage 32 without opening the refrigerating space door 20 and the sub door 40.

In the above embodiment, the position of the marker when the plurality of cameras 610 and 620 are provided has been described. Unlike this, when one camera is located in the sub door, one camera may be installed at the same or similar position as the position where the first camera 610 of the previous embodiment is installed. In this case, the window of the camera may be arranged to be inclined with respect to a vertical line. That is, the upper end of the window may be tilted to approach the door storage. In addition, one marker may be located at the same or similar position as the position of the first marker 34 of the previous embodiment. That is, the marker may be located on the inclined wall at a position where the one camera may photograph the marker.

As another example, one marker may be used by installing a plurality of cameras 610 and 620. For example, by comparing a first ROI image extracted from first images photographed by the first camera in a state in which only the first marker 34 is provided with the first template image of the first marker, any one first ROI image may be selected. Then, a first image corresponding to the selected first ROI image may be extracted.

In this case, the number of images photographed by the first camera and the number of images photographed by the second camera are the same. That is, the photographing order of the plurality of first images is the same as the photographing order of the plurality of second images.

Accordingly, a second image having the same photographing order as the extracted first image may be extracted from the plurality of second images. Then, a resultant image including the finally extracted first image and the extracted second image may be displayed on the display.

What is claimed is:
1. A refrigerator comprising:
a cabinet having a storage space; and
a door configured to open and close the storage space,
wherein the door comprises:
a main door that includes an opening and a door storage;
a sub door configured to open and close the opening of the main door by rotating about a hinge with respect to the main door, the sub door comprising: a door liner having an opening, and a panel assembly to cover the opening of the door liner;

first and second cameras mounted to the door liner of the sub door and spaced apart from each other, the first and second cameras configured to photograph the door storage of the main door when the sub door is opened relative to the main door;

a marker disposed on the main door and configured to be photographed by the first camera mounted to the door liner of the sub door; and a display configured to display a resultant image based on a plurality of images photographed by the first and second cameras.

2. The refrigerator of claim 1, wherein the main door includes a front wall, and the marker is disposed to be inclined with respect to the front wall of the main door.

3. The refrigerator of claim 2, wherein the marker is disposed closer to the storage space than the front wall of the main door.

4. The refrigerator of claim 1,
wherein the main door includes a front wall and an inclined wall that is inclined with respect to the front wall, and
wherein the marker is disposed on the inclined wall, or the first camera is disposed higher on the sub door than the second camera, and the marker is disposed higher than the first camera.

5. The refrigerator of claim 1, wherein the door liner comprises a first dike and a second dike, which are spaced apart from each other in a horizontal direction and protrude in a direction away from a front surface of the sub door:
the first dike is disposed farther from the hinge of the sub door than the second dike; and
the first and second cameras are installed on the first dike.

6. The refrigerator of claim 1, comprising:
a memory,
wherein the first camera is to obtain a plurality of first images by photographing the door storage at regular first time intervals until the sub door is closed,
wherein the second camera is to obtain a plurality of second images by photographing the door storage at regular second time intervals until the sub door is closed, and
wherein the plurality of first images are stored in the memory, and the plurality of second images are stored in the memory.

7. The refrigerator of claim 6, wherein the memory is to store a template image of the marker,
wherein the template image of the marker is photographed when an angle between a window of the first camera and a front surface of the main door is a prescribed reference angle.

8. The refrigerator of claim 7, comprising a controller configured to:
extract, from the plurality of first images, a first Region Of Interest (ROI) image including the marker,
compare the extracted first ROI image with the template image, and
select the first ROI image most similar to the template image,
extract a first image corresponding to the selected first ROI image,
extract, from the plurality of second images, a second image having a same photographing order as the extracted first image, and
control the display to display a resultant image that includes the extracted first image and the extracted second image.

9. The refrigerator of claim 6,
wherein the marker includes a first marker, and
the door includes a second marker to be photographed by the second camera.

10. The refrigerator of claim 9,
wherein the first camera is spaced apart from the second camera in an upper-and-lower direction, and
wherein the first marker is spaced apart from the second marker in an upper-and-lower direction.

11. The refrigerator of claim 10, wherein the first marker and the second marker are disposed closer to the storage space than a front wall of the main door.

12. The refrigerator of claim 11,
wherein the main door includes an upper wall, side walls and a lower wall configured to form the opening of the main door,
wherein the upper wall includes an inclined wall that is inclined downward from the opening of the main door to the storage space, and
wherein the first marker is disposed on the inclined wall.

13. The refrigerator of claim 12,
wherein the main door includes an upper-and-lower extension wall disposed closer to the storage space than the opening of the main door, and
wherein the second marker is disposed on the upper-and-lower extension wall.

14. The refrigerator of claim 9, comprising a memory to store a first template image of the first marker and a second template image of the second marker that are photographed when an angle between a window of each of the first and second cameras and a front surface of the main door corresponds to a prescribed reference angle.

15. The refrigerator of claim 14, comprising a controller configured to:
extract, from the plurality of first images, a first Region Of Interest (ROI) image including the first marker,
compare the extracted first ROI image with the first template image, and
select a first ROI image most similar to the first template image,
extract, from the plurality of second images, a second ROI image including the second marker,
compare the extracted second ROI image with the second template image, and
select a second ROI image most similar to the second template image, and
extract a first image corresponding to the selected first ROI image and a second image corresponding to the selected second ROI image.

16. The refrigerator of claim 15, wherein the display is configured to display a resultant image that includes the extracted first image and the extracted second image.

17. The refrigerator of claim 1, wherein the display is disposed on the sub door.

18. A refrigerator comprising:
a cabinet including a storage space; and
a door configured to open and close the storage space,
wherein the door comprises:
a main door that includes an opening and a door storage;
a sub door configured to open and close the opening of the main door and to rotate about a hinge with respect to the main door;
a camera mounted to the sub door and configured to photograph an image of the door storage of the main door in state in which the sub door is opened relative to the main door and the main door is closed relative to the storage space; and a marker disposed on the main door and configured to be photographed by the camera mounted to the sub door, wherein the marker is disposed to be inclined with respect to a front wall of the main door.

19. The refrigerator of claim 18, wherein the marker is disposed on the main door to be closer to the storage space than the front wall of the main door.

20. The refrigerator of claim 18, wherein the main door includes an inclined wall that is inclined with respect to the front wall, and the marker is disposed on the inclined wall.

\* \* \* \* \*